Feb. 1, 1955  A. J. MULLARKEY  2,701,301
AXLE COUNTING ARRANGEMENT
Filed April 29, 1949
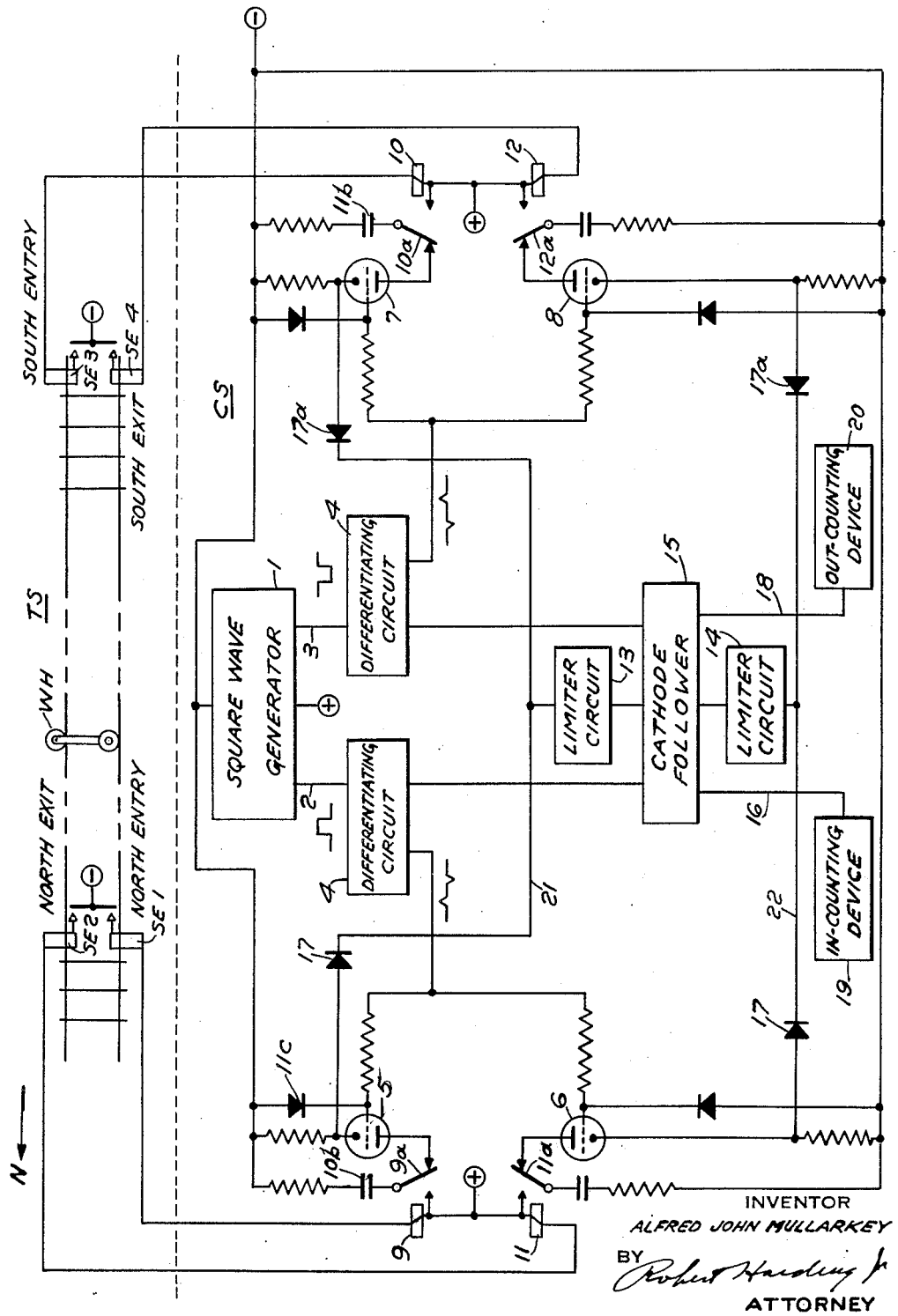
INVENTOR
ALFRED JOHN MULLARKEY
BY Robert Harding Jr
ATTORNEY

United States Patent Office 2,701,301
Patented Feb. 1, 1955

2,701,301

AXLE COUNTING ARRANGEMENT

Alfred John Mullarkey, London, England, assignor to International Standard Electric Corporation, New York, N. Y., a corporation of Delaware Application April 29, 1949, Serial No. 90,315

Claims priority, application Great Britain May 21, 1948

7 Claims. (Cl. 246—247)

This invention relates to electrical signalling apparatus and more particularly to signal separating apparatus for railway signalling systems.

It is known in multichannel pulse transmission systems to provide a "gating" circuit with a plurality of inlets and one outlet in which pulses received at different inlets are passed through gates opened in turn to the outlet. In such circuits however the repetition frequencies of the received pulses are correlated with each other and with the timing of the opening of the inlet gates. There is no question of any "queuing" facility being required.

The present invention is concerned with the case where the signals are received at different inlets at completely random time intervals. The inlet gates are opened at regular intervals one after the other and storage facilities are provided for signals which are received at an inlet when that particular gate is not open.

It is an object of the invention to provide such gating and storage circuits which are simple and reliable in operation. Use is therefore preferably made of cold cathode gas discharge tube technique, but the invention is not limited to the use of such, or any particular type of tubes.

One particular application of the invention is in conjunction with railway axle counting equipment.

Such equipment may incorporate direction discriminating apparatus which receives signals representative of the passage of wheels at the end of a track section. It discriminates between those received when a wheel passes into the section and those received when a wheel leaves the section, transmitting further signals which may be described as entry and exit signals. Naturally, for each track section there are two sets of such apparatus, one for each end. These are required to send their entry and exit signals into central equipment which is able to count the number of wheels which enter and leave and thereby to record the condition of the track section as "occupied" or "unoccupied." In such central counting equipment it may be necessary that only one "in" or "out" (i. e., entry or exit) counting impulse shall be applied to it at once. In the cases however where the track section is short and the train long, signals may well be transmitted simultaneously from the direction discriminating apparatus associated with the two ends of the track section. Apparatus is therefore required, between each set of direction discriminating apparatus and the common counting equipment, which will accept the signals transmitted from the discriminating apparatus and feed to the counting equipment, one at a time, signals which will effect "in" or "out" counting therein. The apparatus provided according to the present invention fulfills this purpose.

One feature of the invention provides a signal separating apparatus adapted to standardise the period of repetition of signals occurring at random time intervals comprising energy gathering means for the reception of the said signals, storage means to store the energy produced by the received signals, an output circuit, means to periodically discharge the energy stored in said storage means to said output circuit at a frequency at least as high as the highest frequency of repetition of the said received signals.

According to a second feature of the invention there is provided a signal separating apparatus adapted to count signals occurring at random time intervals comprising energy gathering means for the reception of the said signals, storage means to store the energy produced by the received signals, a counting device, means to periodically discharge the energy stored in said storage means to said counting device at a frequency at least as high as the highest frequency of repetition of the said received signals.

A further feature of the invention provides a signal counting apparatus adapted to count the number of axles occupying a predetermined section of railway track wherein a plurality of sources generate signals indicative of the entry of axles onto the section of track and a plurality of sources generate signals indicative of the exit of axles from the said section of track comprising a plurality of energy gathering means for the reception of said signals, each of said means corresponding to a separate source of said signals, storage means for each of said energy gathering means to store the energy produced by said signals, a counting device, means to sequentially discharge each of said storage means into said counting device at a frequency at least as high as the highest frequency of repetition of said signals from a single source, means for said counting device to add the number of said signals indicative of the entry of axles onto the said section of track and to subtract the number of said signals indicative of the exit of axles from the said section of track.

The invention will be particularly described with reference to one embodiment thereof shown in the accompanying drawing, which is a track and a circuit diagram of a piece of electrical apparatus for use in railway axlecounting equipment for the purpose set out above. Parts of the circuit which are well known to those skilled in the art are shown in schematic form only.

In the drawing, there is shown schematically, a section of railway track TS, into and out of which it will be assumed that it is desired to count the number of train axles WH. A pair of switch elements, SE1, SE2 is disposed at one end of the track section, and a similar pair of switch elements SE3 and SE4 are located at the opposite end of the track section. All of the switch elements are of a known direction-discriminating type. Thus, switch SE1, labelled "North Entry," is adapted to complete an electric circuit when a train wheel WH moves into the north end of track section TS, travelling in a southerly direction, but switch SE2, labelled "North Exit," will not complete an electric circuit except when a wheel passes out of the track section in a northerly direction. Similarly, switch SE3, the "South Entry" switch, operates when a wheel moves into the track section travelling in a northerly direction, but switch SE4, or the "South Exit" switch will not operate unless a wheel moves out of the track section proceeding in a southerly direction. The switch elements SE1 . . . SE4 are well known and form no part of the present invention. The switch elements SE1 . . . SE4 are coupled to a central station generally indicated below the dashed line as CS.

In the drawing, it will be seen that a positive potential is applied to a square wave generator 1 from which there are output leads 2 and 3 carrying square wave currents which are 180° out of phase with each other. These are fed into differentiating circuits 4, 4', from where in each case a peaked wave form is obtained. The output of differentiating circuit 4 is applied to the grids of the cold cathode gas discharge tubes 5 and 6 whilst the output of the other differentiating circuit 4' which is 180° out of phase with that of the first circuit 4 is led to the grids of the similar tubes 7 and 8.

Turning now to the receipt of the entry and exit signals transmitted from the two sets of direction discriminating switches SE1 . . . SE4 associated with the two ends, say North and South of the track section it will be seen that these signals effect the operation of relays shown at 9, 10, 11 and 12; relays 9 and 11 following the entry and exit signals respectively at the North end, while relays 10 and 12 act similarly for the South end.

It will be appreciated that the relays 9 and 11 cannot operate simultaneously since such operation could be caused only by a wheel entering and leaving the northerly end of the track section at the same instant, which dual movement is an impossibility. Similarly, it would be impossible for relays 10 and 12 to operate because a wheel could not enter and leave from the southerly end of the track section at the same instant.

The detailed operation of the circuit on the receipt of an entry signal from the North entry end will now be considered. Peaked waveform bias potential is continuously applied to the grid of tube 5 but has no effect thereon owing to the absence of any anode potential on tube 5. The North entry signal operates relay 9 and its associated contact 9a thereby, connecting the positive terminal of a source of high voltage to the condenser 10b and charging it up. The cessation of the signal releases relay 9 and thus restores contact 9a and the charged condenser 10b is connected to the anode of the tube 5. The tube will conduct upon the receipt on the grid of the next positive peak of the input from the differentiating circuit 4 negative peaks being by-passed to ground through the rectifier 11c. The intelligence that relay 9 has operated may be said to be stored in condenser 10b until the receipt at the grid of tube 5 of the next positive peak from the differentiating circuit 4. Tube 5 conducts, since the stored charge on condenser 10b acts as the anode potential supply for the tube. An output pulse is derived from the cathode of tube 5 and which pulse is fed to the limiter circuit 13 via rectifier 17 over conductor 21. It will be noted that output pulses from tube 7 are similarly fed to limited circuit 13 from the cathode of the last named tube. Tube 7 is triggered in a similar manner to that described with respect to tube 5, in response to signals received from South Entry switch SE3 as a result of the actuation of relay 10 and the charging of its associated condenser 11b.

Although it is possible for two trains to simultaneously enter from opposite ends of a track section to cause the simultaneous signalling of the entry condition from both ends, e. g., during train shunting operations, it is not possible for the two outputs fed to the circuit 13 to be received there together. This is because the necessary condition for the tubes 5 and 7 to strike are not present on both tubes at the same time. The outputs from the differentiating circuits will be remembered to be 180° out of phase.

The outputs from the North and South exit circuits, those containing tubes 6 and 8 respectively, are similarly fed to a common limiter circuit 14. The North Exit switch SE2 and the South Exit switch SE4 operate in similar manner to that described with respect to switches SE1 and SE3 above upon the departure of a wheel from the track section and cause discharge of tubes 6 and 8 in the same manner as that described with respect to the operation of tubes 5 and 7. Output pulses from the cathodes of tubes 6 and 8 in this case also cannot arrive at the limiter 14 simultaneously. Standard amplitude pulses from limiters 13 and 14 are fed into the common double tube cathode follower circuit 15. From the latter circuit two separate output leads 16 and 18 are taken to the counting equipment shown in block form as Counting Device (In) 19 and Counting Device (Out) 20, pulses on lead 16 being in-counting pulses and pulses on the lead 18 being out-counting pulses.

It will be understood that the circuits 13, 14 and 15, which are shown schematically, are not necessary to be included in apparatus embodying the invention, for these are known pulse-shaping circuits. A common output lead 21 is provided from the cathode circuits of tubes 5 and 7 to the limiter circuit 13 and a similar common output lead 22 is provided from the cathodes of tubes 6 and 8 extending to the input of limiter circuit 14, and may be taken to any suitable outlet arrangement. In the method shown and described, the rectifiers 17 act merely as components for preventing unwanted backward interaction between the pulse shaping circuits and the four tube gating circuits.

For certain applications it may be required that the outputs of the four gating circuits are fed into a common outlet in turn or in a particular order. A slight modification to the circuit already described is one in which four separate 90° out of phase outputs are taken from the square wave generator and are fed through suitable intermediate apparatus to the four gating circuits "opening the gate" of each in turn. Alternatively the railway example described may be viewed as apparatus which ensures that of two groups of input pulses fed into the apparatus the groups being "entry" and "exit" signals respectively, not more than one output pulse in each group shall be transmitted at any particular time.

By providing a number of out-of-phase supplies to the grids of the gating tubes, apparatus according to the invention may be made capable of receiving pulse signals from any desired number of groups of inputs and carrying out such separation that the transmission of only one pulse in each group is possible at any time.

While the principles of the invention have been described above in connection with specific embodiments and particular modifications thereof, it is to be clearly understood that this description is made only by way of example and not as a limitation on the scope of the invention.

What is claimed is:

1. A signal separating apparatus adapted to separate and standardize the period of repetition of signals received at random time intervals from a plurality of independent signal sources comprising a plurality of signal responsive means, each coupled to a different one of said independent sources, a plurality of separate signal storage means, each adapted to store energy from a different one of said independent sources under control of said signal responsive means, an output circuit, means for selectively coupling groups of said storage means with said output circuit in a predetermined sequence, said coupling means including a source of periodic control voltage, the recurrence of said control voltage being at least as rapid as the highest frequency of repetition of signals from a single one of said independent signal sources, whereby the random received signals are discharged into said output circuit at the period of said control voltage.

2. A signal separating apparatus adapted to separate and standardize the period of repetition of signals received at random time intervals from a plurality of independent signal sources as claimed in claim 1 wherein said coupling means further comprises a plurality of gating circuits, one for each of said storage means, each of said gating circuits including an electron discharge tube, each of said tubes having an anode, a cathode and a starting electrode, said control voltage source coupled to each of said starting electrodes, whereby selected groups of said gating circuits corresponding to said groups of storage means, are rendered exclusively conductive to the exclusion of other groups thereof.

3. A signal separating apparatus adapted to separate and standardize the period of repetition of signals received at random time intervals from a plurality of independent signal sources as claimed in claim 2, wherein said storage means comprises a condenser.

4. A signal separating apparatus adapted to separate and standardize the period of repetition of signals received at random time intervals from a plurality of independent signal sources as claimed in claim 2 wherein said source of periodic control voltage comprises a wave generator having means to apply wave potentials to the starting electrodes of groups of said tubes, each group adapted to receive a different wave phase from said generator.

5. A signal counting apparatus adapted to count the number of axles occupying a predetermined section of railway track wherein a first set of two signal generators signal respectively the entry and exit of axles at one end of the track and a second set of two signal generators signal respectively the entry and exit of axles at the other end of the track comprising an energy storage means for each of the said signal generators, means to apply the said generated signals to the said energy storage means, a counting device adapted to be coupled to said storage means, separate means coupled between each of said storage means and said counting device to alternately discharge the said energy storage means corresponding to the first set of signal generators and the energy storage means corresponding to the second set of signal generators into the said counting device at a cyclic frequency at least equal to the highest frequency of repetition of signals from a single signal generator, and means in the said counting device to add the number of signals of entry and to add the number of signals of exit, the difference between the total number of entry signals and exit signals being indicative of the total number of axles remaining in said track section.

6. A signal counting apparatus adapted to count the number of axles occupying a predetermined section of railway track comprising a means at each end of the track to generate signals indicative of the entry of axles onto the track, a means at each end of the track to generate signals indicative of the exit of axles from the track, an energy storage means for each of the said signal generating means, means to apply the said signals to said energy storage means, a counting device adapted to be coupled to said storage means, a gating circuit for each of said storage means connected between separate ones of said energy storage means and said counting device, single means to make the gating circuits corresponding to the signal generators at one end of the track and the gating circuits corresponding to the signal generators at the other end of the track alternately conductive at a rate at least as high as the highest frequency of repetition of the generated signals from a single signal generating means, and means in said counting device to add the number of said signals indicative of the entry of axles onto the said section of track and to subtract the number of said signals indicative of the exit of axles from the said section of track.

7. A signal counting apparatus according to claim 6 wherein said energy storage means for each of the said signal generating means comprises a condenser and wherein said gating circuit for each of the said storage means comprises a cold cathode diode and a series resistance connected across said condenser, said cold cathode diode having a starting electrode and said resistor being connected in parallel with said counting device, and wherein said means to make the said gating circuits alternately conductive comprises a wave generator having means to apply peaked wave potentials of opposite phase to the said starting electrodes.

References Cited in the file of this patent

UNITED STATES PATENTS

| | | |
|---|---|---|
| 1,879,070 | Burke | Sept. 27, 1932 |
| 2,006,582 | Callahan et al. | July 2, 1935 |
| 2,046,157 | Gibbs | June 30, 1936 |
| 2,103,481 | Mathes | Dec. 28, 1937 |
| 2,110,172 | Phinney | Mar. 8, 1938 |
| 2,317,400 | Paulus et al. | Apr. 27, 1943 |
| 2,329,048 | Hullegard | Sept. 7, 1943 |
| 2,368,874 | Poole | Feb. 6, 1945 |

FOREIGN PATENTS

| | | |
|---|---|---|
| 102,295 | Australia | Oct. 19, 1937 |